UNITED STATES PATENT OFFICE.

HEINRICH WALLAND, OF BRÜNN, AUSTRIA-HUNGARY, ASSIGNOR TO ERSTE TRIESTER REISSCHAEL-FABRIKS-ACTIEN-GESELLSCHAFT, OF TRIESTE, AUSTRIA-HUNGARY.

PROCESS FOR RENDERING VEGETABLE PROTEINS SOLUBLE.

1,016,115. Specification of Letters Patent. Patented Jan. 30, 1912.

No Drawing. Application filed April 21, 1910. Serial No. 556,722.

*To all whom it may concern:*

Be it known that I, HEINRICH WALLAND, K. K. professor, residing at 135 Neugasse, Brünn, Moravia, in the Empire of Austria-Hungary, a subject of the Emperor of Austria-Hungary, have invented new and useful Improvements in Processes for Rendering Vegetable Proteins Soluble, of which the following is a specification.

Whereas various methods have been described for bringing starch, for finishing tissues, into solution in the form of dextrin or sugar, or even in the form of amyloid-like bodies, it has only been possible hitherto, for the purposes mentioned, to dissolve the proteins either very imperfectly, as by fermentation, or by employing liquids having a very strong alkaline reaction. Inasmuch as in the latter case, the excessive amount of alkali has an injurious action, it is necessary to neutralize the alkali by means of an acid. The slightest excess of acid, however, occasions the precipitation of the protein and consequently, this process is very troublesome.

The process forming the object of the present invention permits in a technically very simple manner of rendering the protein completely soluble, both in its pure condition as well as also when existing in various natural and artificial mixtures, and thus constitutes an essential progress in the art of finishing tissues.

The process consists essentially in this that vegetable proteins after the addition of per-compounds particularly the per-borates and per-carbonates of sodium are heated or boiled for some time with water whereby the oxygen acting in the nascent condition converts the proteins into a form in which they are easily soluble in the presence of a very slight quantity of free alkali resulting from the hydrolysis of the above mentioned per-compound. Generally speaking it will not be necessary to neutralize the slight quantities of free alkali formed, more particularly when using the per-borate. Both pure protein as well as mixtures of protein and starch, and the like may be boiled with water after the addition of per-compounds, and thereby rendered soluble.

A dry mixture of per-compounds and protein or the above mentioned mixture containing protein may be made, whereby when boiling with water the protein passes into solution. For rendering the substance to be treated soluble, for 100 parts of the substance to be dissolved 1–10 parts of the per-compound is used, according to the degree of solubility desired.

I claim:

The process of rendering vegetable protein soluble which consists in adding a small quantity of a per-borate to the vegetable protein and subsequently boiling in water.

In testimony whereof I affix my signature in presence of two witnesses.

HEINRICH WALLAND.

Witnesses:
 JRAIMER KARL,
 AUGUST FUGGER.